(12) United States Patent
Riviere et al.

(10) Patent No.: US 6,558,729 B1
(45) Date of Patent: *May 6, 2003

(54) FROZEN ICE CREAM DESSERT AND PROCESS FOR MAKING

(75) Inventors: Philippe Riviere, Toulouse (FR); Stéphane Silvente, Toulouse (FR); Frank Tonon, Normanville (FR); Veronique Andre-Linet, Gravigny (FR)

(73) Assignee: Nestec S.A., Vevey (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/125,926

(22) PCT Filed: Feb. 26, 1997

(86) PCT No.: PCT/FR97/00338

§ 371 (c)(1), (2), (4) Date: Aug. 25, 1998

(87) PCT Pub. No.: WO97/30600

PCT Pub. Date: Aug. 28, 1997

(30) Foreign Application Priority Data

Feb. 26, 1996 (FR) .............................. 96 02527

(51) Int. Cl.$^7$ .............................. A23G 9/02; A23G 9/04
(52) U.S. Cl. ....................................................... 426/565
(58) Field of Search ................................ 426/565, 654, 426/567, 566

(56) References Cited

U.S. PATENT DOCUMENTS

| | | | | |
|---|---|---|---|---|
| 4,145,454 A | * | 3/1979 | Dea et al. ................... | 426/565 |
| 4,244,977 A | * | 1/1981 | Kahn et al. ................. | 426/330 |
| 4,282,262 A | * | 8/1981 | Blake ......................... | 426/565 |
| 4,376,791 A | * | 3/1983 | Holbrook et al. ........... | 426/565 |
| 4,400,406 A | * | 8/1983 | Morley et al. .............. | 426/565 |
| 4,421,778 A | * | 12/1983 | Kahn et al. ................. | 426/454 |
| 4,552,773 A | | 11/1985 | Kahn et al. ................. | 426/564 |
| 4,808,428 A | * | 2/1989 | Forsstrom ................... | 426/659 |
| 4,853,243 A | * | 8/1989 | Kahn et al. ................. | 426/454 |
| 5,084,295 A | * | 1/1992 | Whelan et al. ............. | 426/565 |
| 5,149,551 A | * | 9/1992 | Anderson ................... | 426/231 |

FOREIGN PATENT DOCUMENTS

| | | | |
|---|---|---|---|
| GB | 2019187 | * | 4/1979 |
| JP | 58109734 | * | 6/1983 |

OTHER PUBLICATIONS deMan, J., Principles of Food Chemistry, 2nd Ed., Van Nostrand Reinhold, 1990, p. 161–163.*
J. deMan, Principles of Food Chemistry, Second Edition, Van Nostrand Reinhold, pp., 152, 161–163, 1990.*
Frozen Yogurt, Ice Cream Short Course, Pennsylvania State University, p. 166–182, Jan. 1990.*
Frozen Desserts Containing Tofu, Ice Cream Short Course, Pennsylvania State University, pp. 159–164, Jan. 1990.*

* cited by examiner

Primary Examiner—Arthur L. Corbin
(74) Attorney, Agent, or Firm—Nixon & Vanderhye, P.C.

(57) ABSTRACT

A frozen dessert which is spoonable at freezing temperatures and/or packageable in pressurized containers is disclosed. The frozen dessert has dairy proteins, fats, sweeteners, one or more stabilizing agents, flavoring agents or coloring agents. The proteins are provided by dairy milk products or skimmed milk. The fat is a vegetable oil with a very low freezing point. The sweeteners are a mixture of low molecular weight sweetening agents such as dextrose and/or fructose, invert sugar and glucose syrup.

31 Claims, No Drawings

FROZEN ICE CREAM DESSERT AND PROCESS FOR MAKING

TECHNICAL FIELD

The invention presented here involves a frozen dessert. The frozen dessert according to the invention is of the type which consists essentially of proteins originating from milk, fats, sweeteners, and one or more stabilizers.

The frozen dessert according to the invention could, depending on the requirements, contain flavoring agents, coloring agents, or edible included substances, where it is itself included in pastries, for example, with a pastry coating.

BACKGROUND

These products are traditionally obtained by freezing the components mentioned above. To preserve them until consumption, they must be kept in a freezer in which freezing temperature can be up to minus 18° and even minus 24° C.

Due to this fact, products obtained without being subjected to a period of reheating, have a particularly hard consistency which prevents their immediate consumption and makes them impossible, or at least difficult, to separate by the spoonful.

In the case of a sizable portion, when the portion has not been entirely consumed, its preservation, after it has been reheated in order to be separated, requires re-freezing which has an effect on the structure of the product making large crystals possible, giving a watery taste in the mouth, a texture which is harder and bacteriological risks.

Moreover, these products, after thawing to a consumption temperature, lose a part of their properties of stability and their qualities of taste. The prior art has proposed some solutions:

The patent GB 1563191 proposes making an ice cream which can be spooned out at the freezing temperature and has a composition which contains both stabilizers and products of the glycerol type which lower the freezing point.

The patent GB 2019187 describes a preparation similar to the above patent in which in addition to the stabilizers and the products of the glycerol type, the sweeteners used are sweeteners having a low molecular weight, of the sucrose, glucose, fructose, invert sugar type which enter into the composition because of their ability to lower its freezing point.

The patent U.S. Pat. No. 4,400,406 involves a frozen dessert which can be extruded. However, in the part involving the extrusion of the ice cream, there are no references to the temperature, which is probably on the order of −5 to 6° C. No mention is made of extrusion at −20° C. According to example six, coconut oil is used, which has a high melting point, at a level of 11%. In these conditions, the coconut oil gives a hard product which cannot be spooned out.

In the composition of the patent U.S. Pat. No. 4,400,406, there is described a mixture of fructose, sorbit, and corn syrup (which can be replaced by starch hydrolyzate or invert sugar). The choice of corn syrup is customary. The presence of sorbit is justified by a need to compensate for the low quantity of fructose, which otherwise gives a large amount of sugar taste to the product.

In so far as the choice of stabilizer is concerned, the patent U.S. Pat. No. 4,400,406 mentions the quasi-exhaustive list of all of the products in the known field. The product according to the patent is characterized by a choice of a particular percentage of stabilizer and by an express combination of three different stabilizers having gelatin or the equivalent.

The patent U.S. Pat. No. 4,421,778 (KAHN 12/83) involves a product of the "milk-shake" type which is expanded in order to thus be able to be preserved at the freezing temperature and cannot be spooned out or extruded at this temperature. This US patent involves a whipped product, thus containing a significant proportion of air. There is described the preservation time of six months without losing significant volume corresponding to the deflation of the product and its contraction.

Insofar as the fat is concerned, KAHN cites the use of a fat specifically preventing the formation of crystalline surfaces, and thus the crystallization of fat.

The patent U.S. Pat. No. 4,853,243 (KAHN 8/89) involves a whipped product having novelty which is due to the limitation of crystallization. The philosophy is to use a preliminary mixture which is treated afterwards, after defrosting and whipping. This again involves a product close the one above and the spooning capability at the freezing temperature results from its higher air content. There is no description importance of fat used to the melting point, nor the importance of the sweetening mixture to the selection of sugars.

The patent GB A 1 563 191 (UNILEVER 3/80) describes a lowering of the freezing point by using a mixture of stabilizers and polyols (glycerol or sorbit).

It has become apparent that stabilizers frequently must be used in such proportions that the texture in the mouth and the taste of the product obtained can be modified, in the same way as its appearance, which can become gummy with a taste of fat. At the same time, the use of sweetening agents having low molecular weights can affect the taste of the product if the composition of sweetening agents is not closely controlled.

SUMMARY OF THE INVENTION

The polyols or glycerols used to lower the freezing point have, in addition, the disadvantage of not being digestible by humans and of having laxative effects.

The invention presented here intends to obviate these disadvantages while making possible the creation of a frozen dessert which can be spooned out at the freezing temperature and able to be packaged in a container under pressure. This result is obtained by a selection of fat of vegetable origin having a very low melting point and by the selection of a mixture of specific sweeteners having lower molecular weights and by the mixture with proteins originating from milk.

To this end, the frozen dessert according to the invention, having a composition comprising proteins originating from milk, fat, sweeteners and one or more stabilizers, is essentially characterized in that:

the proteins are produced by -substitute products coming from milk and/or skimmed milk having 20% to 40% proteins relative to the raw product;

the fat used is an oil of vegetable origin having a low melting point;

the sweeteners are a mixture of sweetening agents having low molecular weights, the aforementioned mixture having dextrose and/or fructose; invert sugar and glucose syrup.

According to another characteristic of the invention, the mixture of sweeteners comprises:

dextrose and/or fructose, invert sugar, glucose syrup, and in which, the invert sugar has an equally high percentage of inversion, for example, equal to 93 plus or minus 3;

the glucose syrup has a dextrose equivalent on the order of 40% for example, consisting of between 35 and 70%.

Other advantages and characteristics of the invention appear in reading the following description and from its implementation process.

DETAILED DESCRIPTION OF THE INVENTION

The frozen dessert according to the invention is of the type made by a mixture of proteins coming from milk, fat, and sweeteners. This mixture is designed to be frozen after it is made and to be distributed in a frozen state to the consumer, either in an individual helping, or shares to be divided in helpings, or in a package under pressure.

The share to be divided into helpings can be frozen in a single package such as a small tub.

Any other type of use can be implemented, such as filling a deep-frozen cake which is to be divided up, or others.

The product according to the invention can also be distributed in the form of UHT treated liquid and be submitted to freezing by the user.

The problem to be solved is:

firstly, to make a product which in the temperature range from minus 18 ° C. to minus 24 ° C., is at the same time sufficiently supple so that it can be spooned out without the necessity of the product being expanded by the incorporation of gas, or pass through a nozzle under pressure into a container in which the product is packaged under pressure;

secondly, to make a product which is physically stable at the time of consumption while having the organoleptic qualities of an ice cream.

The starting idea has been to adjust three fundamental components, sugars, fats, and proteins, in the relative percentages and in the nature of the aforementioned components and/or ingredients of each of them in order to lower the freezing point of the mixture.

It is apparent that the proteinic ingredients essentially have an influence on the stability and the texture of the ice cream, notably at the outlet of a nozzle when it is packaged in a container under pressure.

It has become apparent that the nature of the proteinic ingredients, skimmed milk or -substitutes, the blending ratios and the composition of the proteinic ingredients have an influence on the texture of the ice cream at the freezing temperature.

It has become apparent in the course of the tests that the ratio of the proteinic ingredients comes to be between 6% and 18%. Below 6%, the texture of the product is quite liquid but lacks consistency and stability. Above 18%, the product is very firm. In the range between 6% to 18%, the product stays malleable while being more firm if the ratio of the proteins is increased.

The proteinic products can be made of -substitutes only or of a mixture of -substitutes and powdered skimmed milk or the latter as the only ingredient.

In an advantageous way, the -substitutes are products of powder originating from milk and composed mainly of proteins originating from serum and containing 20% to 40% proteins. The percentages mentioned are given by weight in weight.

Different sweeteners have been tested as substitutes for saccharose, these materials being of a lower molecular weight in order to lower the freezing point. Three types of mixtures of sweeteners have been determined for this purpose which give roughly the same result on the level of texture which can be spooned out, but different in sweetness.

The first mixture or first combination includes a total percentage of sugars expressed relative to the total formula consisting of 24.6% dry matter, of which:

dextrose or fructose: 8.2% invert sugar: 8.2% glucose syrup: 8.2% With this type of mixture, the sweetness is increased enough.

The second mixture or second combination has a total percentage of sugars expressed relative to the total formula of 20.3% in dry matter, of which:

dextrose or fructose: 10.0% invert sugar: 3.3% glucose syrup: 7.0% With the second type of mixture, the sweetness is less intense than the first one.

The third mixture or third combination of sweeteners includes a total of sugars expressed relative to the total formula of 20.3% in dry matter, of which:

dextrose or fructose: 13.3% glucose syrup: 7.0%

The glucose syrup used has a hydrocarbon composition around 49% glucose and 26% saccharides. The invert sugar is characterized by a high degree of inversion (percentage of hydrolyzed saccharose) on the order of 93% plus or minus 3%. The glucose syrup used has a dextrose equivalent on the order of 70%, for example, between 69.7% and 73.7%.

It is possible within the scope of the invention to use a glucose syrup having a low dextrose equivalent, for example, between 35% and 70%. Glucose syrups used can thus have a dextrose equivalent having around 40% and a glucidic composition with, for example, 15% dextrose and 10% disaccharides, and a dextrose equivalent of around 70% and a glucidic composition with, for example, 28% dextrose and 50% disaccharides, or 49% glucose and 26% disaccharides.

The different combinations of sweetening substances are given in total dextrose equivalent given by the percentage of monohydrated dextrose and the percentage of dextrose present in the glucose syrup.

The combinations of sweetener have in common their dextrose equivalent and it is possible within the scope of the invention to use a glucose syrup having a low dextrose equivalent. The percentage of total dextrose (from standard monohydrated dextrose and glucose syrup) amounts to between 6% and 30%.

It has been observed that the more the percentage of dextrose is increased, the more the product obtained is supple and malleable. It is possible to use fructose in partial or total substitution with dextrose; the result obtained is satisfying in terms of the texture, but has a sweeter taste.

Moreover, the invert sugar can be used in partial or total substitution with dextrose and gives good results in terms of the texture. However, in this case, the pronounced sweet taste must be hidden by blending, for example, with amerizing substances.

The fat used is one of the main factors acting on the final texture of the product and in obtaining a texture which is not very firm at the freezing temperature. Different tests have shown that the fat having a low freezing point which was most suited was sunflower oil, which has a starting solidification at around minus five degrees Celsius, to be completely solid at around minus twenty degrees Celsius. This oil is characterized by a low melting point.

The optimum blending percentages to reach the anticipated result are between 6% and 24%. Below 6%, the product obtained is very firm, which makes it particularly inappropriate for packaging in a container under pressure. Beyond 24%, the product obtained is malleable but has a runny appearance and begins to become limited in terms of the taste with a little more lingering fat taste.

Between 6% and 24%, the more the proportion of sunflower oil is increased, the more the ice cream is supple and fluid and the more it has substance when it is tasted in the mouth. It goes without saying that other fats coming from vegetable oil having the equivalent characteristics to those of sunflower oil are able to be used.

A type of composition of the product according to the invention can be the following:

| | |
|---|---|
| sunflower oil | 16.5% to 18.5% |
| powdered skimmed milk (or lacto-substitute) | 11.6% to 10% |
| dextrose | 13.3% |
| glucose syrup | 8.8% |
| stabilizer | 0.6% to 0.3% |
| liquid skim milk | 49.0% to 49.1% |

In order to obtain a sufficiently supple substance, it is apparently preferable to combine a higher ratio of fat, when the ratio of sweetener is at the bottom of the range, and a higher ratio of sweetener, when the ratio of fat is at the bottom of the range. It is possible to have the following compositions:

| | |
|---|---|
| sunflower oil: 20% | sunflower oil: 15% |
| powdered skimmed milk (or lacto-substitute): 11.6% | powdered skimmed milk (or lacto-substitute): 11.6% |
| dextrose: 10% | dextrose: 15% |
| glucose syrup: 8.8% | glucose syrup: 8.8% |
| stabilizer: 0.6% | stabilizer: 0.6% |
| liquid skim milk: 49% | liquid skim milk: 49% |

According to another embodiment form the invention, it is possible to blend polyols or sugar alcohol into the composition. As an example, sorbit can be added in a proportion of 3 to 5%; in this case, the proportion of dextrose goes from 13.3% to 10.3%.

It is also possible to use substances like polyols, ethanol, or even sugars such as galactose which are able to lower the freezing point.

The implementation of ingredients is done while preparing any of the ingredients in the liquid form, skimmed milk and sunflower oil. Liquid ingredients are submitted to a heated mixture under the action of a stirring apparatus. Thus, powdered skim milk and powdered stabilizers are contributed. The stabilizers are a mixture of mono and diglycerides of fatty acids possibly with-carob, guar, carrageenates, alginates, gelatin, etc. The stabilizers are chosen in a manner so as to modify the texture and the stability of the frozen dessert. This contribution is done by stirring. It is preferable to bring the mixture to a temperature of at least 65° C. to 70° C., before adding sugars, in order to be able to add the stabilizers. The sugars are then added and the temperature is brought to or held at around 70° C. The dry extract is then adjusted to around 45% with water if necessary. It is also possible to heat only the liquid skimmed milk and to add the sunflower oil after the powdered skimmed milk and the stabilizer.

The preparation is then homogenized using a homogenizer in order to obtain a homogeneous distribution of fat globules having a small diameter. A homogenization can be performed before and after the thermal treatment.

The homogenization is significant for the stability of the product when it is in the non-frozen form. It is also significant for the final texture of the product. An interesting technique for having the correct size of the fat globules without changing the texture is to make a pre-emulsion of all the ingredients without the sweeteners. The pressure of homogenization is from 25 bars to 200 bars. The preparation is then submitted to a maturation process over a time period varying from several hours to one night in a cooling refrigerator, for example, at +3° C. This maturation can be done at the same time as a stirring of the product.

The preparation can then be directly deep-frozen with a simultaneous expansion or UHT-treated then placed in a container under pressure and then deep-frozen. The preparation can be subjected to a treatment of the UHT-type directly by injecting steam or pulverizing in the steam.

Putting it into a container under pressure can also be done directly after pasteurization or UHT-treatment, the maturing and freezing taking place afterwards.

Deep-freezing is done in a refrigerated enclosure between −18° C. and −24° C. The preservation of the product obtained is done in a refrigerated enclosure at a temperature consisting of between minus 18° C. and minus 24° C.

The packaging can, according to commercial and usage conditions, be done in a tub or a container under pressure. Containers under pressure can be of the siphon bottle type or of the pressurized can type. In this case, a neutral gas is injected into the product, the latter is generally a neutral gas of the nitric oxide type. A propellant, nitrogen for example, is also injected until the necessary pressure is reached in the container.

We claim:

1. A frozen ice cream dessert composition which is malleable and extrudable at freezing temperatures between −18° C. and −24° C., the composition comprising:

milk proteins produced from a lacto-substitute raw product derived from a milk product, said milk product being selected from the group consisting of milk, skimmed milk, and a mixture thereof, said milk proteins being 20% to 40% of said lacto-substitute raw product;

a liquid vegetable-based oil, said composition comprising no non-digestible polyols;

optionally water;

a sweetener which is a mixture of sweetening agents having molecular weights lower than that of sucrose, said sweetening agents being selected from the group consisting of dextrose, fructose, invert sugar and glucose syrup such that the total percentage of dextrose, when present, is between 6% to 30% of said sweetener, said fructose and said invert sugar being a total or partial substitute of said dextrose; and at least one stabilizer, wherein said milk proteins, said vegetable-based oil, said optional water, said sweetener and said stabilizer are mixed and homogenized together without external air or external gas incorporated therein during mixing and homogenizing, the frozen ice cream dessert composition having a volume, without expansion by incorporation of gas, approximately equal to the cumulative volume of said milk proteins, said vegetable-based oil, said optional water, said sweetener and said stabilizer, the composition being frozen to a temperature of between −18° C. and −24° C.

2. The dessert of claim 1, said vegetable-based oil being sunflower oil.

3. The dessert of claim 1, said invert sugar having a degree of inversion equal to 93% plus or minus 3%.

4. The dessert of claim 1, said glucose syrup having a dextrose content of between 69.7% and 73.7%.

5. The dessert of claim 1, said glucose syrup having a carbohydrate content containing 49% glucose by weight and 26% saccharides by weight.

6. The dessert of claim vegetable-based oil being sunflower oil of between 16.5% to 18.5% by weight of the total composition, said milk product being skimmed milk powder of between 10% to 11.6% by weight of the total composition, said sweetener being a mixture of dextrose and glucose syrup in which said dextrose is 13.3% by weight of the total composition and glucose syrup is 8.8% by weight of the total composition, said stabilizer being between 0.3% to 0.6% by weight of the total composition, the balance of the total composition being liquid skimmed milk.

7. The dessert of claim 1, said sweetener being 24.6% by weight of the total composition, said sweetener being a mixture of dextrose and invert sugar and glucose syrup in which each of said dextrose, invert sugar and glucose syrup is 8.2% by weight of the total composition.

8. The dessert of claim 1, said sweetener being 20.3% by weight of the total composition, said sweetener being a mixture of dextrose or fructose of 10% by weight of the total composition, invert sugar of 3.3% by weight of the total composition and glucose syrup of 7% by weight of the total composition.

9. The dessert of claim 1, said milk proteins being between 6% and 18% of the total weight of the total composition.

10. The dessert of claim 1, said sweetener being 20.3% by weight of the total composition, said sweetener being a mixture of dextrose or sucrose of 13.3% by weight of the total composition and glucose syrup of 7% by weight of the total composition.

11. The dessert of claim 1, said vegetable-based oil being 6% to 24% by weight of the total composition.

12. The dessert of claim 1, said glucose syrup having a dextrose content of between 35% and 70% by weight of the total weight of said glucose syrup.

13. The dessert of claim 1, said glucose syrup having a dextrose content of 40% by weight and a carbohydrate composition having dextrose of 15% by weight and disaccharides of 10% by weight.

14. The dessert of claim 1, said glucose syrup having a dextrose content of between 69.7% and 73.7% by weight of the total weight of glucose syrup, said glucose syrup having a carbohydrate composition with dextrose of 28% by weight and of disaccharides of 50% by weight.

15. A process for manufacturing an ice cream dessert including milk proteins obtained from liquid skimmed milk and powdered skimmed milk, at least one stabilizer, a liquid vegetable-based oil, and a sweetening agent having a molecular weight lower than that of sucrose, said dessert comprising no non-digestible polyols, the ice cream dessert being malleable and extrudable at freezing temperatures of between −18° C. and −24° C., the process comprising:

combining a liquid skimmed milk and a liquid vegetable-based oil together by stirring without introducing external air or gas into the combination, to form a first mixture;

heating the first mixture forming a second mixture by adding powdered skimmed milk and a stabilizing agent to the first mixture, without introducing external air or gas , to form the second mixture;

heating the second mixture to a temperature of between 65° C. and 70° C. inclusive to form a heated second mixture;

adding a sweetening agent to the heated second mixture, without introducing external air or gas, to form a third mixture;

optionally adding water to the third mixture;

homogenizing the third mixture at a pressure of between 25 to 200 bar, without introducing external air or gas, to form a homogenized mixture;

cooling the homogenized mixture, without expansion by incorporation of gas, to a temperature of greater than 0° C. for a period of time to form a cooled mixture; and freezing the cooled mixture directly after said period of time to a final temperature of between −18° C. and −24° C. to form a frozen mixture, the frozen mixture having a volume, without expansion by incorporation of gas, approximately equal to a cumulative volume of the liquid skimmed milk, the powdered skimmed milk, the stabilizer, the liquid vegetable-based oil, the optional water and the sweetening agent.

16. The process of claim 15, further comprising:

packaging the frozen mixture in pots at atmospheric pressure.

17. A frozen ice cream dessert composition which is malleable and extrudable at freezing temperatures between −18° C. and −24° C., the composition comprising:

milk proteins produced from a lacto-substitute raw product derived from a milk product, said milk product being selected from the group consisting of milk, skimmed milk, and a mixture thereof, said milk proteins being 20% to 40% of said lacto-substitute raw product;

a liquid vegetable-based oil having a low melting point, said composition comprising no non-digestible polyols;

optionally water;

a sweetener which is a mixture of sweetening agents having molecular weights lower than that of sucrose, said sweetening agents being selected from the group consisting of dextrose, fructose, invert sugar and glucose syrup such that the total percentage of dextrose, when present, is between 6% to 30% of said sweetener, said fructose and said invert sugar being a total or partial substitute of said dextrose; and at least one stabilizer, wherein said milk proteins, said vegetable-based oil, said optional water, said sweetener and said stabilizer are mixed and homogenized together without external air or external gas incorporated therein during mixing and homogenizing, the frozen ice cream dessert composition having a volume, without expansion by incorporation of gas, approximately equal to the cumulative volume of said milk proteins, said vegetable-based oil, said optional water, said sweetener and said stabilizer, the composition being frozen to a temperature of between −18° C. and −24° C.

18. The frozen ice cream dessert composition of claim 17 wherein said oil has a melting point of less than about −5° C.

19. The dessert of claim 17, said vegetable-based oil being sunflower oil.

20. The dessert of claim 17, said invert sugar having a degree of inversion equal to 93% plus or minus 3%.

21. The dessert of claim 17, said glucose syrup having a dextrose content of between 69.7% and 73.7%.

22. The dessert of claim 17, said glucose syrup having a carbohydrate content containing 49% glucose by weight and 26% saccharides by weight.

23. The dessert of claim 17, said vegetable-based oil being sunflower oil of between 16.5% to 18.5% by weight of the total composition, said milk product being skimmed milk powder of between 10% to 11.6% by weight of the total composition, said sweetener being a mixture of dextrose and glucose syrup in which said dextrose is 13.3% by weight of the total composition and glucose syrup is 8.8% by weight of the total composition, said stabilizer being between 0.3% to 0.6% by weight of the total composition, the balance of the total composition being liquid skimmed milk.

24. The dessert of claim 17, said sweetener being 24.6% by weight of the total composition, said sweetener being a mixture of dextrose and invert sugar and glucose syrup in which each of said dextrose, invert sugar and glucose syrup is 8.2% by weight of the total composition.

25. The dessert of claim 17, said sweetener being 20.3% by weight of the total composition, said sweetener being a mixture of dextrose or fructose of 10% by weight of the total composition, invert sugar of 3.3% by weight of the total composition and glucose syrup of 7% by weight of the total composition.

26. The dessert of claim 17, said milk proteins being between 6% and 18% of the total weight of the total composition.

27. The dessert of claim 17, said sweetener being 20.3% by weight of the total composition, said sweetener being a mixture of dextrose or sucrose of 13.3% by weight of the total composition and glucose syrup of 7% by weight of the total composition.

28. The dessert of claim 17, said vegetable-based oil being 6% to 24% by weight of the total composition.

29. The dessert of claim 17, said glucose syrup having a dextrose content of between 35% and 70% by weight of the total weight of said glucose syrup.

30. The dessert of claim 17, said glucose syrup having a dextrose content of 40% by weight and a carbohydrate composition having dextrose of 15% by weight and disaccharides of 10% by weight.

31. The dessert of claim 17, said glucose syrup having a dextrose content of between 69.7% and 73.7% by weight of the total weight of glucose syrup, said glucose syrup having a carbohydrate composition with dextrose of 28% by weight and of disaccharides of 50% by weight.

* * * * *